US012798614B2

(12) United States Patent
Kar et al.

(10) Patent No.: US 12,798,614 B2
(45) Date of Patent: Nov. 17, 2026

(54) ITERATIVE DEPTH ESTIMATION

(71) Applicant: Motional AD LLC, Boston, MA (US)

(72) Inventors: Akankshya Kar, Santa Monica, CA (US); Apoorv Singh, Pittsburgh, PA (US); Varun Kumar Reddy Bankiti, Bellevue, WA (US)

(73) Assignee: Motinal AD LLC, Boston, MA (US)

( * ) Notice: Subject to any disclaimer, the term of this patent is extended or adjusted under 35 U.S.C. 154(b) by 536 days.

(21) Appl. No.: 18/163,708

(22) Filed: Feb. 2, 2023

(65) Prior Publication Data

US 2024/0262386 A1 Aug. 8, 2024

(51) Int. Cl.

*B60W 60/00* (2020.01)
*G06T 7/50* (2017.01)
*G06V 10/764* (2022.01)
*G06V 10/82* (2022.01)

(52) U.S. Cl.

CPC ........... *B60W 60/0011* (2020.02); *G06T 7/50* (2017.01); *G06V 10/764* (2022.01); *G06V 10/82* (2022.01)

(58) Field of Classification Search

CPC .... B60W 60/0011; G06T 7/50; G06V 10/764; G06V 10/82; G06V 20/58
USPC .................... 382/103, 104, 181; 701/23, 301
See application file for complete search history.

(56) References Cited

U.S. PATENT DOCUMENTS

| | | | | |
|---|---|---|---|---|
| 10,306,203 | B1 * | 5/2019 | Goyal | H04N 13/128 |
| 11,979,661 | B1 * | 5/2024 | Chen | G06T 7/521 |
| 11,987,236 | B2 * | 5/2024 | Ji | G06V 20/64 |
| 12,293,532 | B2 * | 5/2025 | Ling | G05D 1/43 |
| 12,379,497 | B2 * | 8/2025 | Arai | G06V 10/764 |
| 2004/0109585 | A1 * | 6/2004 | Tao | G06T 7/579 382/106 |
| 2004/0252864 | A1 * | 12/2004 | Chang | G06V 20/00 382/104 |
| 2015/0043783 | A1 * | 2/2015 | Ishihara | G06T 7/571 382/106 |
| 2016/0034787 | A1 * | 2/2016 | Mitsui | G06F 18/214 345/87 |
| 2016/0182880 | A1 * | 6/2016 | Tang | H04N 23/741 382/154 |

(Continued)

OTHER PUBLICATIONS

Berthet, Q. et al., "Learning with Differentiable Perturbed Optimizers", Advances in Neural Information Processing Systems 33 (NeurIPS 2020), Jun. 9, 2020, pp. 1-24.

Bhat, S. F. et al., "AdaBins: Depth Estimation Using Adaptive Bins", Proceedings of the IEEE/CVF Conference on Computer Vision and Pattern Recognition (CVPR), 2021, pp. 4009-4018.

(Continued)

*Primary Examiner* — Kathleen Y Dulaney

(74) *Attorney, Agent, or Firm* — Knobbe, Martens, Olson & Bear, LLP

(57) ABSTRACT

Provided are methods for image depth estimation, which can include obtaining image associated with a scene of an autonomous vehicle, determining a first estimated depth for a plurality of points in the image, and generating a plurality of groups of points based on the first estimated depth for the plurality of points. Some methods described also include determining a second estimated depth for at least one point using a range specific depth estimation head, determining at least one object classification for the at least one point, and causing the autonomous vehicle to be navigated based on the second estimated depth for the at least one point and the at least one object classification for the at least one point. Systems and computer program products are also provided.

20 Claims, 11 Drawing Sheets

(56) References Cited

U.S. PATENT DOCUMENTS

| | | | | |
|---|---|---|---|---|
| 2019/0145768 | A1* | 5/2019 | Sasamoto | G06V 20/58 382/103 |
| 2019/0258878 | A1* | 8/2019 | Koivisto | G01S 7/417 |
| 2020/0195837 | A1* | 6/2020 | Miu | G02B 27/0075 |
| 2020/0327685 | A1* | 10/2020 | Ren | G06V 10/82 |
| 2020/0394770 | A1* | 12/2020 | Roulet | G06T 5/77 |
| 2021/0019536 | A1* | 1/2021 | Motoyama | G05D 1/0246 |
| 2021/0072391 | A1* | 3/2021 | Li | G01S 17/10 |
| 2021/0141079 | A1* | 5/2021 | Ichinose | G01S 13/93 |
| 2021/0342608 | A1* | 11/2021 | Smolyanskiy | G06V 20/584 |
| 2022/0063605 | A1* | 3/2022 | Ji | G06F 18/2193 |
| 2022/0207663 | A1* | 6/2022 | Carbonera Luvizon | G06T 5/77 |
| 2023/0005165 | A1* | 1/2023 | Cai | G06T 7/50 |
| 2023/0012208 | A1* | 1/2023 | Nakamura | H04N 23/959 |
| 2023/0029900 | A1* | 2/2023 | Goel | G06V 20/647 |
| 2023/0084623 | A1* | 3/2023 | Hotson | G06F 18/214 701/23 |
| 2023/0112366 | A1* | 4/2023 | Sugimoto | G06V 20/46 382/180 |
| 2023/0144209 | A1* | 5/2023 | Cai | G06V 20/588 |
| 2023/0177840 | A1* | 6/2023 | Telpaz | B60R 16/0231 |
| 2023/0222817 | A1* | 7/2023 | Sun | G06V 20/64 382/103 |
| 2023/0408688 | A1* | 12/2023 | Lee | G01S 15/08 |
| 2024/0071064 | A1* | 2/2024 | Chung | G06V 10/82 |
| 2024/0094399 | A1* | 3/2024 | Pazhayampallil | B60W 30/146 |
| 2024/0338938 | A1* | 10/2024 | Filimonov | G06V 20/70 |
| 2025/0029374 | A1* | 1/2025 | Bund | G06V 10/806 |
| 2025/0037445 | A1* | 1/2025 | Bund | G06F 18/251 |

OTHER PUBLICATIONS

Cordonnier, J. B. et al., "Differentiable Patch Selection for Image Recognition", Proceedings of the IEEE/CVF Conference on Computer Vision and Pattern Recognition (CVPR) Apr. 7, 2021, pp. 1-15.

Park, D. et al., "Is Pseudo-Lidar Needed for Monocular 3D Object Detection?", Proceedings of the IEEE/CVF International Conference on Computer Vision (ICCV), Autust 13, 2021, 12 pages.

Reading, C. et al., "Categorical Depth Distribution Network for Monocular 3D Object Detection", Proceedings of the IEEE/CVF Conference on Computer Vision and Pattern Recognition (CVPR), Mar. 23, 2021, pp. 1-11.

Shi, X. et al., "Geometry-Based Distance Decomposition for Monocular 3D Object Detection", Proceedings of the IEEE/CVF International Conference on Computer Vision (ICCV), Jun. 29, 2022, 12 pages.

Wang, T. et al., "FCOS3D: Fully Convolutional One-Stage Monocular 3D Object Detection", Proceedings of the IEEE/CVF International Conference on Computer Vision (ICCV) Workshops, Sep. 24, 2021, 11 pages.

Wang, Y. et al., "Pseudo-LiDAR From Visual Depth Estimation: Bridging the Gap in 3D Object Detection for Autonomous Driving", Proceedings of the IEEE/CVF Conference on Computer Vision and Pattern Recognition (CVPR), 2020, 16 pages.

Zhang, Y. et al., "Objects are Different: Flexible Monocular 3D Object Detection", Proceedings of the IEEE/CVF Conference on Computer Vision and Pattern Recognition (CVPR), Apr. 6, 2021, 10 pages.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

* cited by examiner

ITERATIVE DEPTH ESTIMATION

BACKGROUND

Autonomous vehicles may determine the depth of objects within the environment.

DETAILED DESCRIPTION

Figure 1:
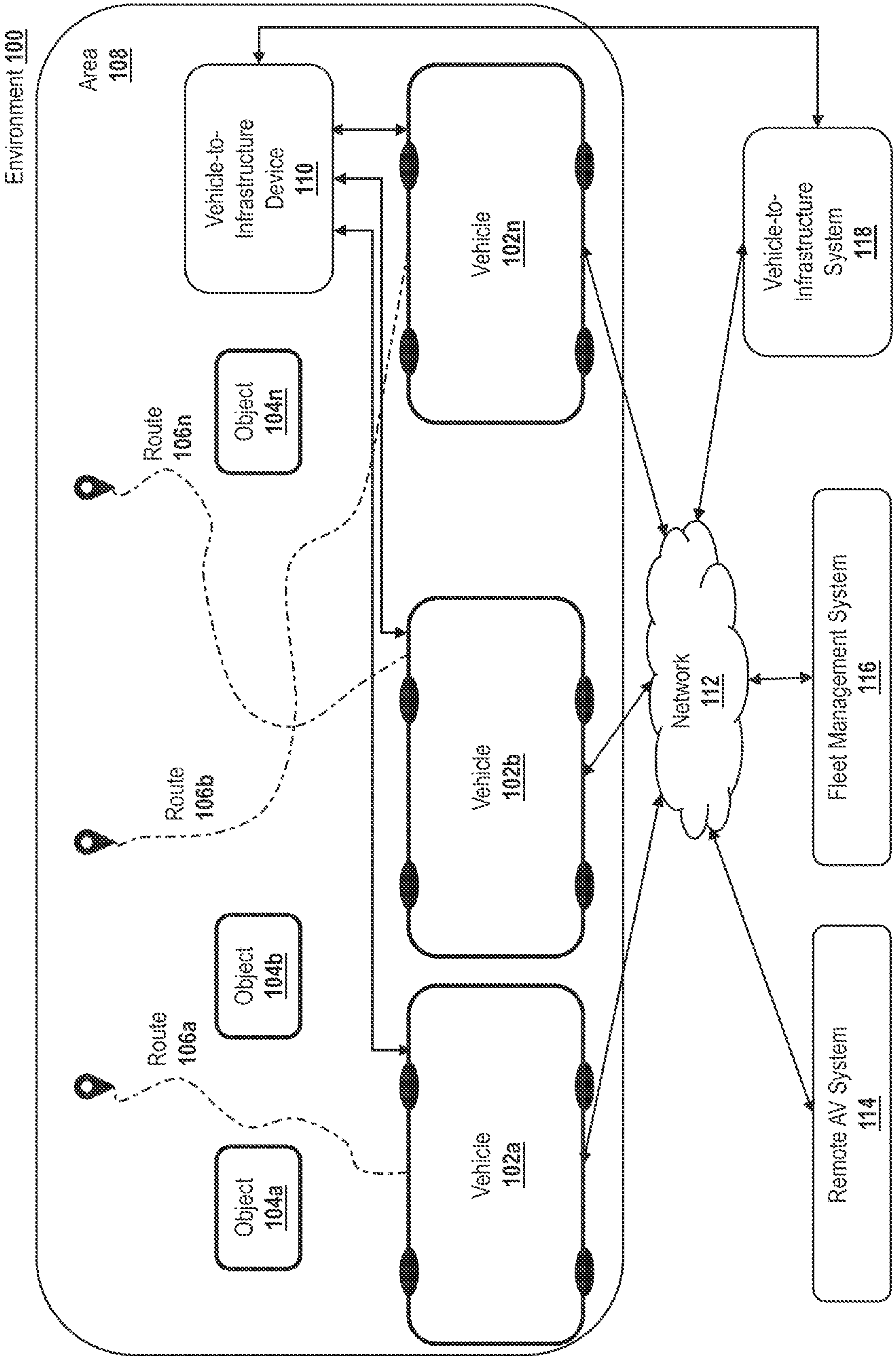
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a method for operating an autonomous vehicle based on binning points within an image to improve a depth estimation of the points.

In particular, certain sensors used to generate images may not natively generate depth (e.g., 3D) information. Sensors that do not natively generated depth information (e.g., a single camera) may be considered "monocular", as opposed to "binocular" sensors (e.g., LiDAR sensors, a pair of cameras, radar sensors, etc.) that generate depth information. By virtue of the implementation of systems, methods, and computer program products described herein, a system may bin points in the image into a plurality of groups based on a first corresponding estimated depth for each point, and determine a second corresponding estimated depth for at least one point in at least one of the groups. By binning the points into groups based on the first estimated depths, the depth of objects detected from the image may be more quickly and/or more accurately determined.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
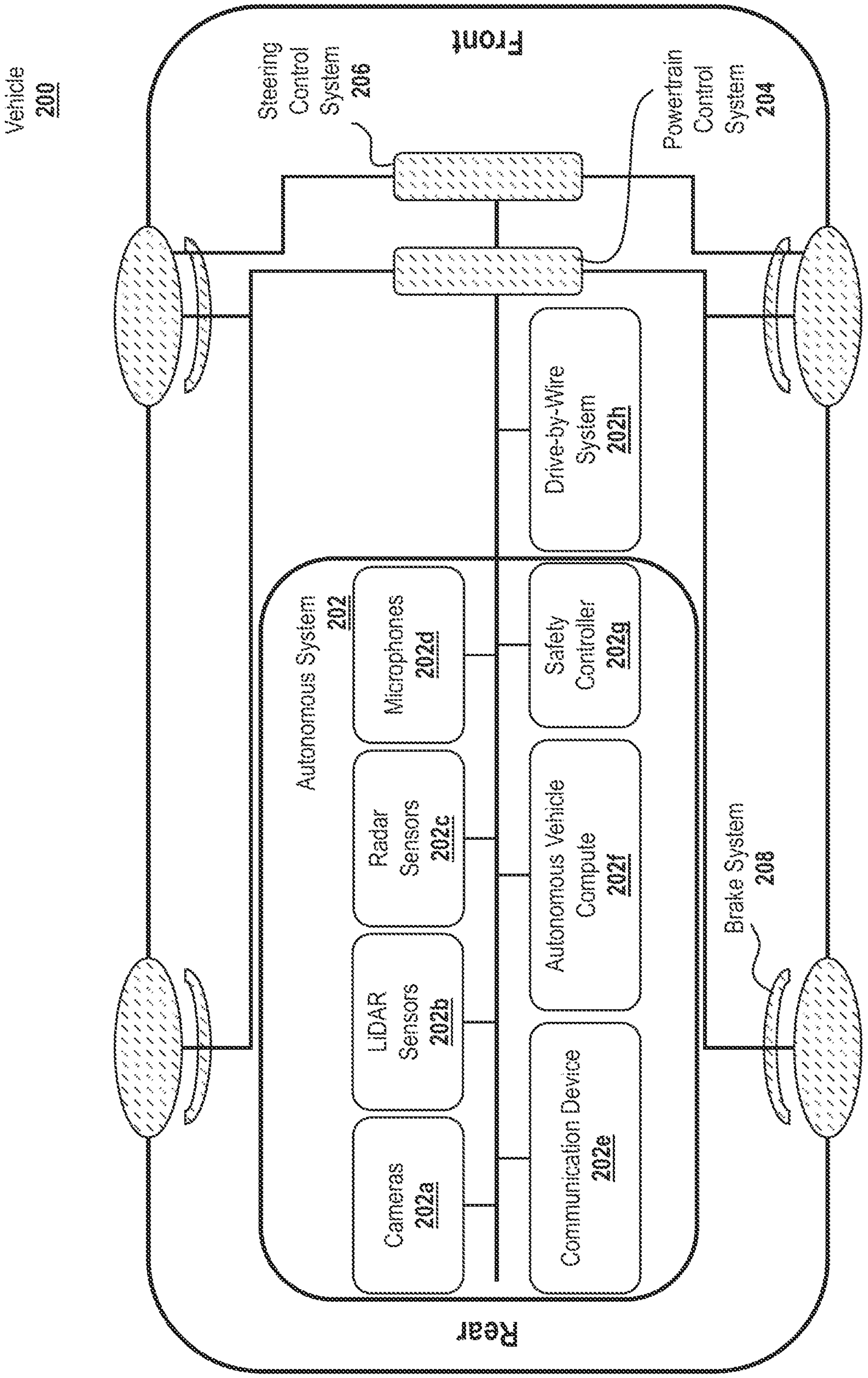
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras **202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202***e*, autonomous vehicle compute 202*f*, drive-by-wire (DBW) system 202*h*, and safety controller 202*g*.

Figure 3:
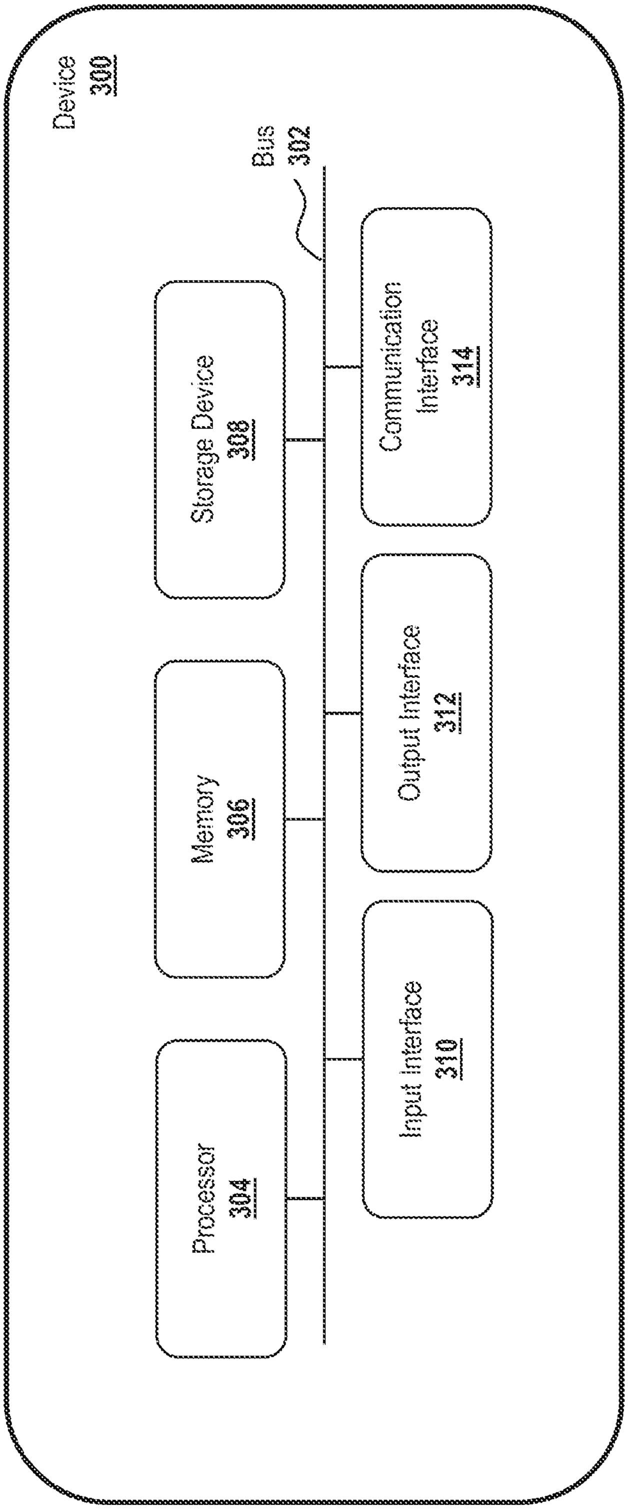
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras

202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
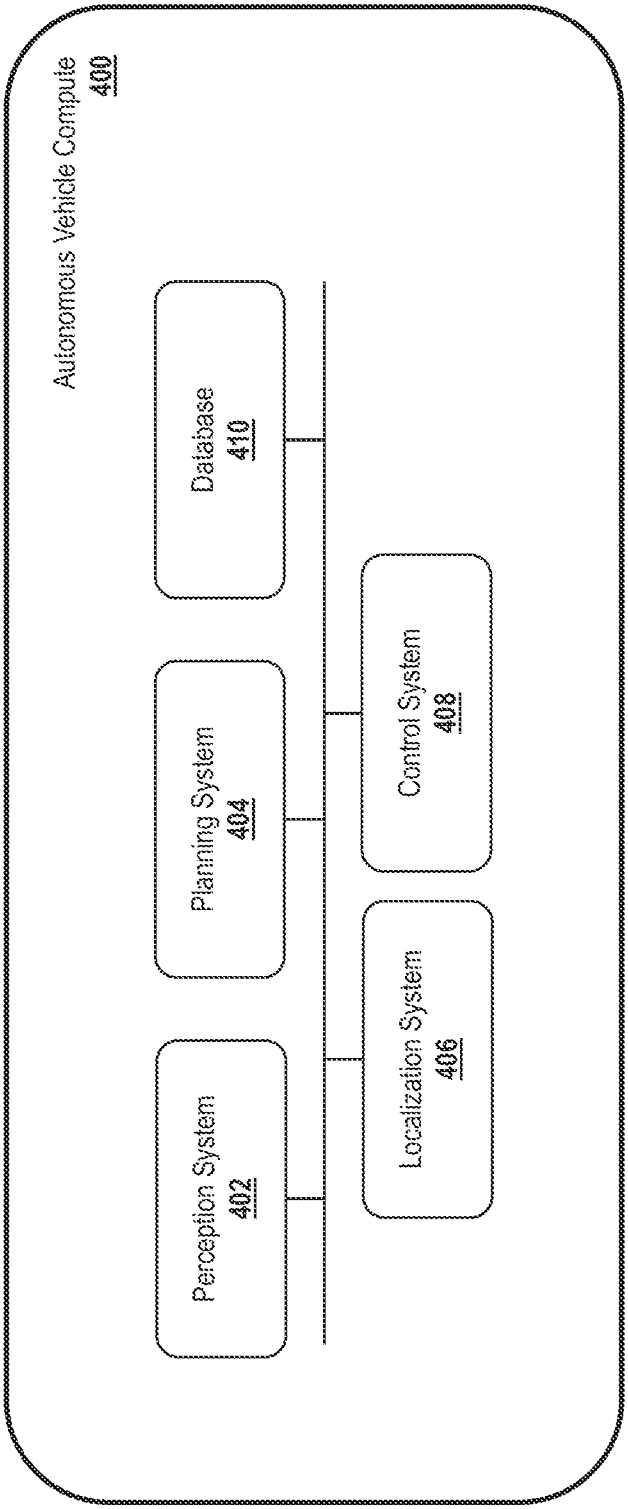
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LIDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
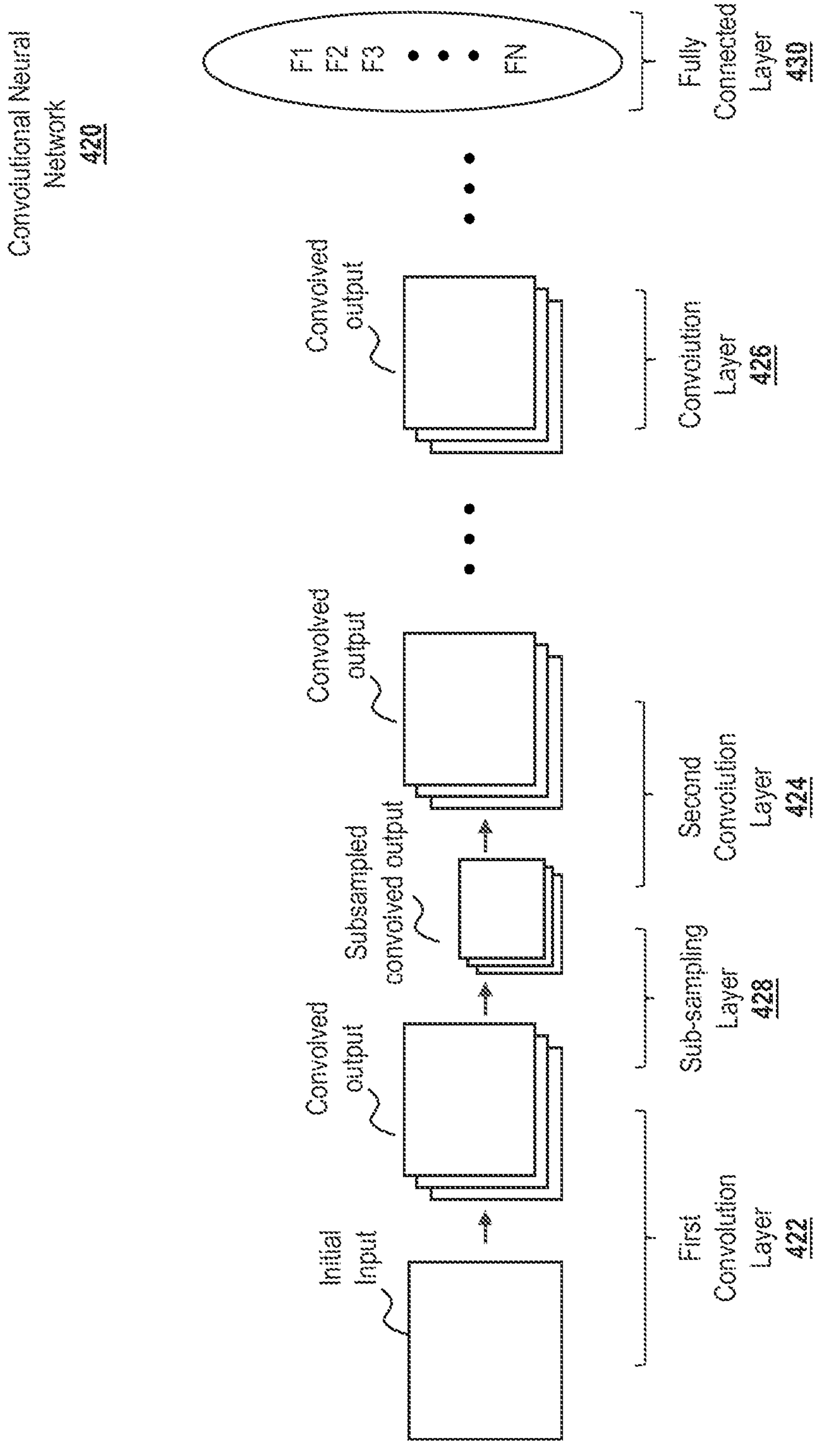
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
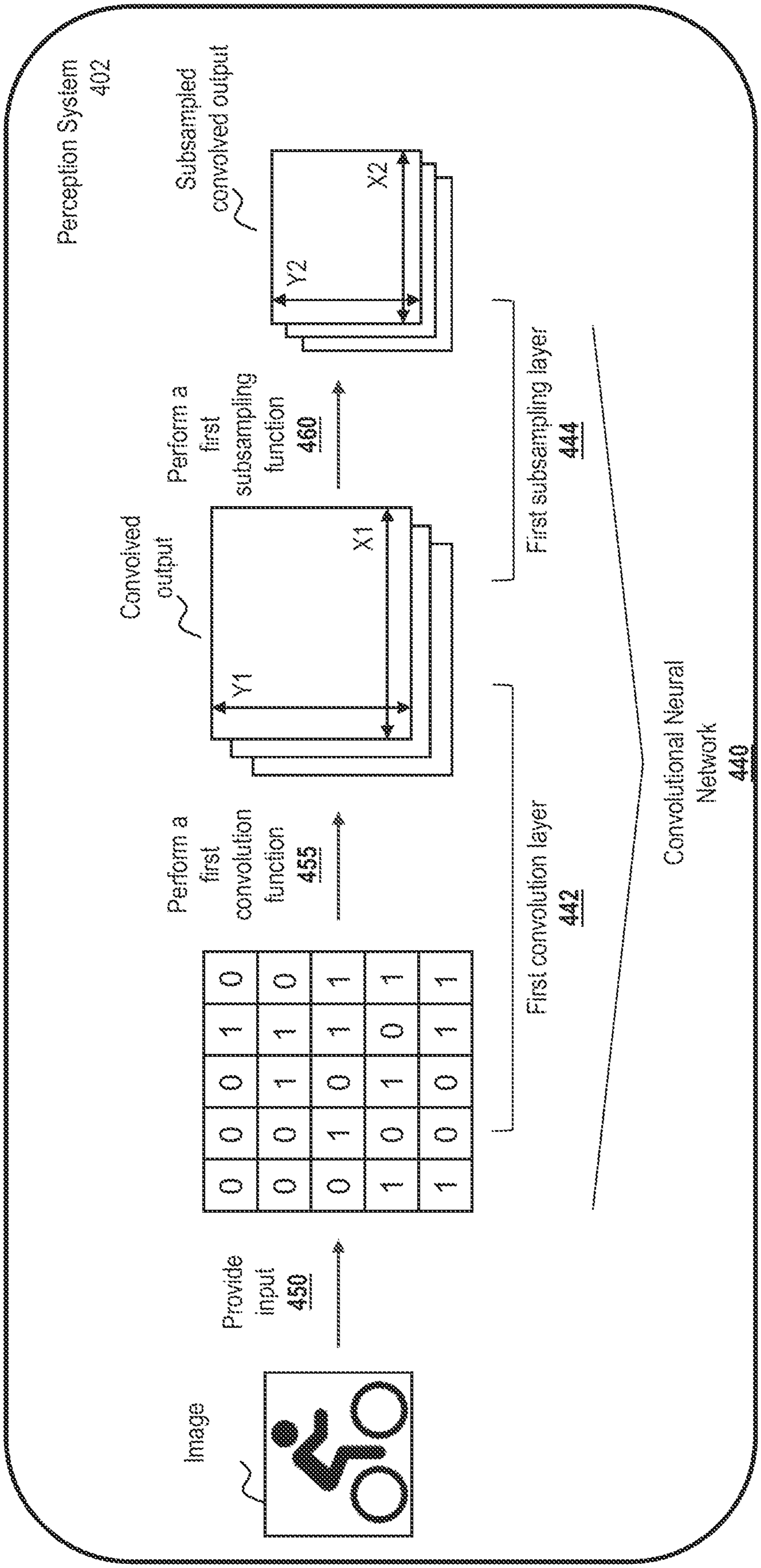
FIGS. 4C and 4D are a diagram illustrating example operation of a CNN.
Figure 4D:
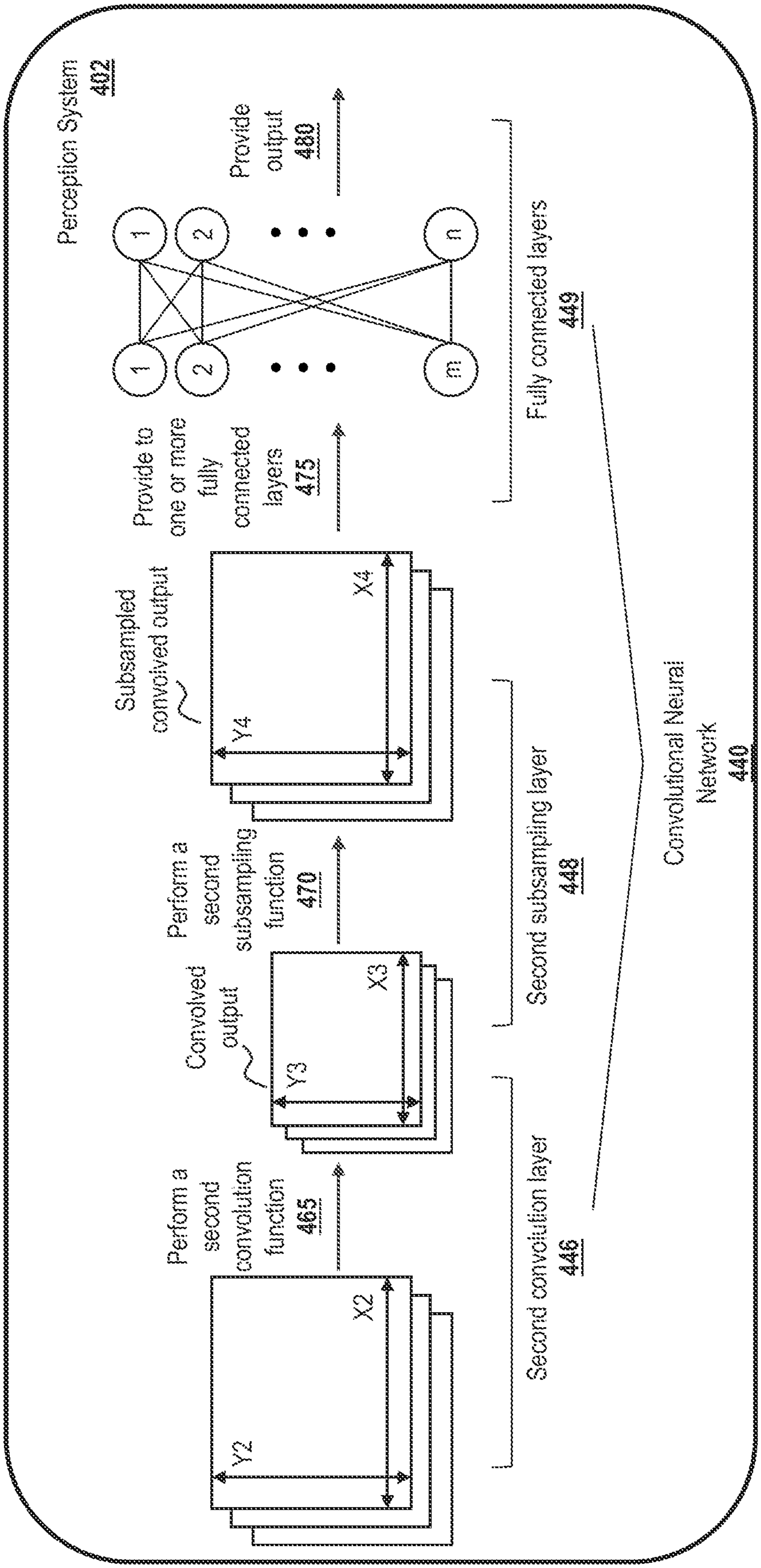

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Depth Estimation

Figure 5A:
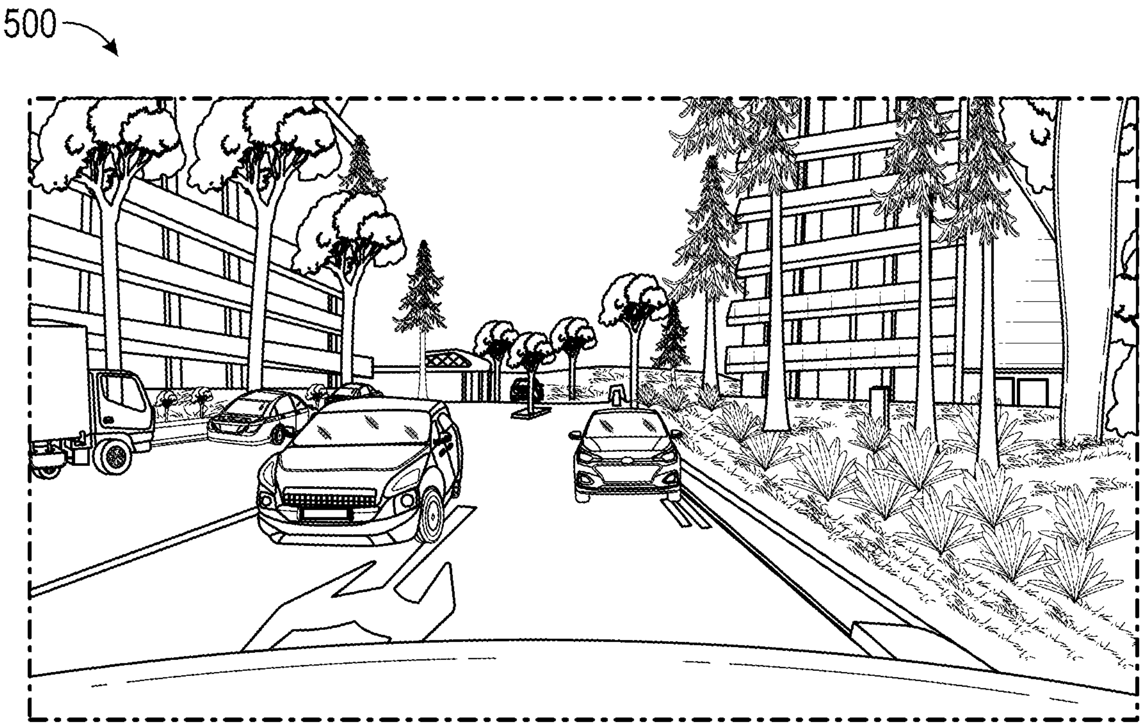
FIG. 5A illustrates an example image that can be captured by a camera.

While the autonomous vehicle is navigating through the environment, the perception system 402 may receive images associated with a scene of an autonomous vehicle detect one or more physical objects (e.g., cars, buses, curbs, people, and/or the like) within the images. For example, the image may include image data captured by at least one camera (e.g., cameras 202*a*) from which the perception system 402 may detect one or more physical objects within a field of view of the camera. FIG. 5A illustrates an example image 500 that may be captured by a camera. The image 500 includes a number of physical objects that may be relevant to the navigation of the autonomous vehicle. However, because the image 500 is two-dimensional (2D), the image 500 may not natively include depth information for the pixels forming the image 500.

Figure 5B:
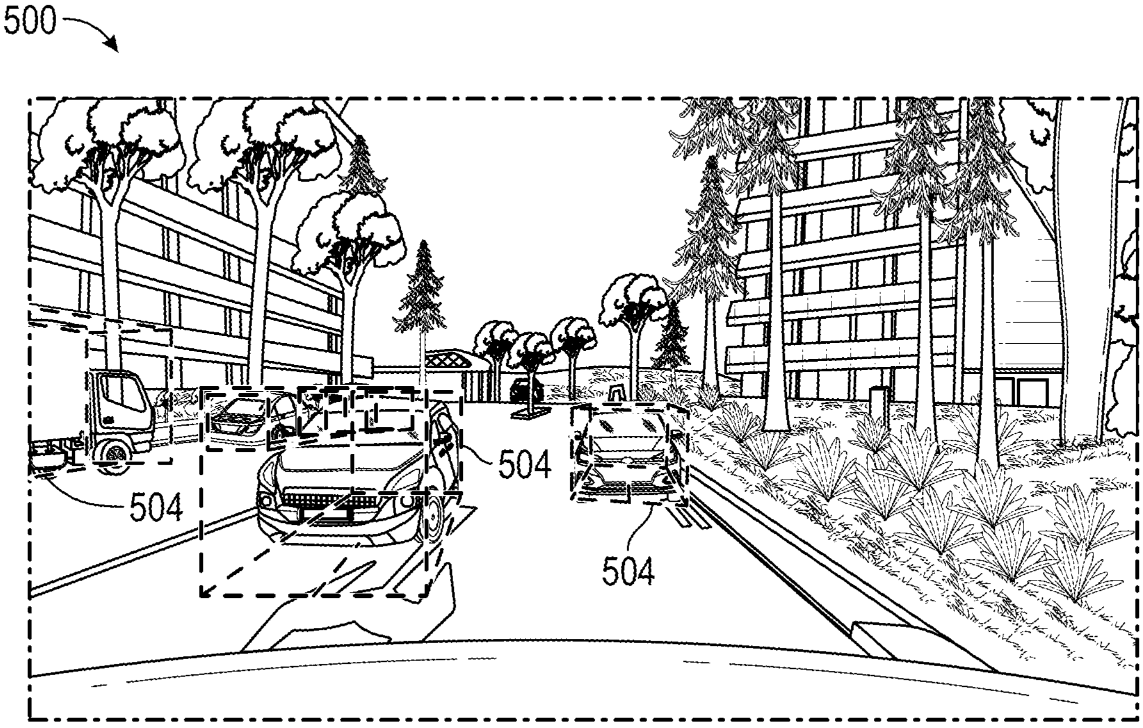
FIG. 5B illustrates an example image with bounding boxes overlaid thereon for each of the detected objects.

In order to safely navigate around the objects within the environment, it is important for the autonomous vehicle to detect certain physical objects within the environment as well as the locations of the detected objects. FIG. 5B illustrates an example image 500 with bounding boxes 504 overlaid thereon for each of the detected objects. In particular, the perception system 402 may generate the bounding boxes based on estimating the depth of the objects and/or pixels within the image 500.

Aspects of this disclosure relate to techniques for improving the depth estimation for pixels and objects within an image. For example, the perception system 402 may determine a first corresponding estimated depth for each of a plurality of points in images and generate a plurality of groups of points based on the first corresponding estimated depths. The perception system 402 may determine a second corresponding estimated depth for at least one point in a first group of points using a range specific depth estimation head and determine at least one object classification for the at least one point. By grouping the points based on the first estimated depths and determining a second depth estimate using a range specific depth estimation head, the perception system 402 can more accurately determine the depths of the points compared to other depth estimation techniques.

Figure 6:
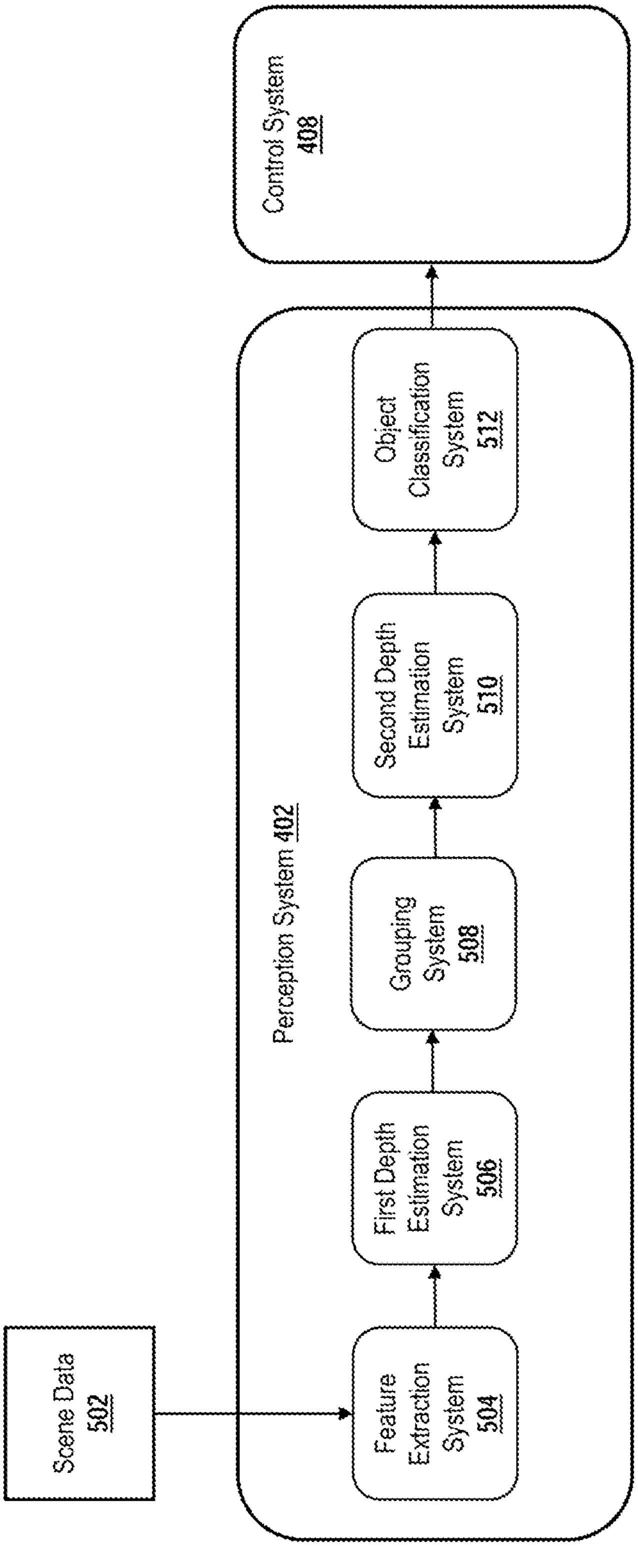
FIG. 6 is a data flow diagram illustrating an example of a perception system receiving an image, estimating depths, and classifying objects to control the vehicle.

FIG. 6 is a block diagram illustrating an example perception environment in which the perception system 402 receives and processes images 502, estimates depths, and classifies objects to control the vehicle 200. In the illustrated example, the perception system 402 includes an image feature extraction system 504, a point depth estimation system 506, a grouping system 508, and an object classification system 510, however, it will be understood that the perception system 402 may include fewer or more components. For example, in some cases, the perception system 402 may omit the grouping system 508, and the functionality described herein with respect to the grouping system 508 may be performed by the point depth estimation system 506.

The images 502 (also referred to herein as a set of images 502, stream of images, or image stream) may include image data from a particular sensor in a sensor suite. The type of images may correspond to the image sensor used to generate the images 502. For example, the images 502 may be camera images generated from one or more cameras, such as cameras 202*a*, or lidar images generated from one or more lidar sensors, such as lidar sensors 202*b*. Other image types may be used, such as radar images generated from one or more radar sensors (e.g., generated from radar sensors 202*c*).

In some cases, a set of images may correspond to a stream of images from the same image sensor over time. Accordingly, a first image in the set of images may be generated (or captured) by the image sensor at time t0, a second image in the set of images may be generated (or captured) at time t1, etc. As the perception system 402 uses the images 502 to determine object characteristics and/or generate bounding boxes 512 and navigate a vehicle, it will be understood that the perception system 402 may process the images 502 in real-time or near real-time to generate the object characteristics and/or the bounding boxes 512.

Moreover, as there may be multiple image sensors, each image sensor may produce its own set (or stream) of images. Accordingly, images from different streams of images may be generated at approximately the same time. As such, images from different image streams taken at the same time may represent the scene of a vehicle at that time.

In the illustrated example, the perception system 402 includes a feature extraction system 504, a point depth estimation system 506, a grouping system 508, and an object classification system 512, however, it will be understood that the perception system 402 may include fewer or more components. In some cases, any and/or all of the components of the perception system 402 may be implemented using one or more processors or computer hardware (e.g., by microprocessors, microcontrollers, application-specific integrated circuits [ASICs], Field Programmable Gate Arrays (FPGAs), and/or the like). Such processors or computer hardware may be configured to execute computer-executable instructions stored on non-transitory storage media to perform one or more functions described herein. In certain cases, one or more of the components of the perception system 402, such as but not limited to the feature extraction system 504, the point depth estimation system 506, the grouping system 508, and the object classification system 512 may be implemented using one or more machine learning models or neural networks, such as by using the CNN 420. Moreover, it will be understood that the feature extraction system 504, the point depth estimation system 506, the grouping system 508, and the object classification system 512 may be implemented as part of the same system or sub-system (e.g., on the same hardware), as standalone systems and/or as part of another system (e.g., as part of the control system 408, etc.).

The feature extraction system 504 may extract features from the image 502. In some embodiments, the image 502 may include an image captured from a camera having a field of view of a portion of the environment.

The feature extraction system 504 may generate feature maps (also referred to herein as sets of points) from the image. The feature maps may have the same or different shapes from the image 502 used to generate them and/or from each other. For example, if the image 502 has the shape [640, 320, 3], a respective feature map may have the shape [80, 40, 128], [40, 20, 256], and/or [20, 10, 512] however, it will be understood that the feature maps may have different shapes or even different shapes from each other. In some cases, the size or resolution of a feature map may be based on a stride length (e.g., of a convolution layer). In some such cases, the resolution of a particular feature map may depend on the stride length used to generate the feature map. For example, if the image is 640×320 and a stride length of eight is used, the resulting feature map may have a resolution (or size) of 80×40.

Each feature map of the generated feature maps may include an array of grid cells (or points) having a particular channel depth. The grid cells or points may be evenly distributed across an image (e.g., the image may be equally divided amongst the grid cells). The grid cells may include semantic data (or features) extracted from (one or more pixels in) the image(s) 502 or other input (e.g., another feature map) from which the feature map was generated. The features of a grid cell may be organized as a vector or some other tensor shape. For example, the features (or semantic data) of a grid cell may indicate a shape, light, texture, reflectivity, edge, object class, location, estimated distance, likelihood of an object detection, etc. of something detected by the feature extraction system 504.

In certain cases, the feature extraction system 504 may generate multiple feature maps for each image 502. For example, the feature extraction system 504 may include a feature pyramid network (FPN) that generates multiple feature maps from a particular image 502. In some cases, some of the feature maps (e.g., of the multiple feature maps generated from the particular image 502) may be generated from each other. For example, a first feature map may be downsampled (or convolved) to generate a second feature map, and the second feature map may be downsampled (or convolved) to generate a third feature map and so on. In some such cases, the second feature map may have a smaller size and/or resolution (e.g., height and width) than the first feature map, and the third feature map may have a smaller height and width than the second feature map, etc. Moreover, the different feature maps may have different channel depths. For example, the first feature map may have a channel depth of 128, a second (downstream) feature map may have a channel depth of 256, and a third (downstream) feature map may have a channel depth of 512, etc.

As a non-limiting example, the feature extraction system 504 may generate or identify a first feature map from the image 502 and a second feature map from the first feature map (or directly from the image 502).

The feature extraction system 504 may determine a set of semantic features for each of the plurality of points or grid cells in the first feature map and the second feature map. As described herein, the number of points in the first feature map may be greater than the number of points in the second feature map (e.g., if the stride length used to generate the second feature map is larger than the stride length of the first feature map and/or if the second feature map is the output of a second convolution layer that receives the output (e.g., first feature map) from the first convolution layer as its input and applies one or more additional filters at a stride length greater than one).

For example, the feature extraction system 504 may divide the image 502 into the first feature map (e.g., at a first convolutional layer) with a first resolution (or size) and channel depth and divide the image into the second feature map with a second resolution and channel depth. For example, the first feature map may include a first number of points (each corresponding to one or more pixels of the image 502) defining the first resolution with each point having the first channel depth and the second feature map may include a second number of points (each corresponding to one or more pixels of the image 502) defining the second resolution with each point having the second channel depth.

Although two feature maps are discussed as an example, the feature extraction system 504 may determine any number of feature maps, each having different resolutions and/or channel depths. In one non-limiting example having three feature maps, the first feature map may have the dimensions 80×40×128 (height, width, channel depth), the second feature map may have the dimensions 40×20×256, and the third feature map may have the dimensions 20×10×512.

The feature extraction system 504 may extract the features from the image 502 using a variety of techniques. In certain cases, the feature extraction system 504 may extract the features from the image using a backbone with a neural network backbone. In some cases, the neural network backbone may include a CNN, such as CNN 420. For example, the neural network backbone may include a squeeze and excitation network (SENet) residual neural network (ResNet) like architecture, such as a deep ResNet, and/or deep layer aggregation (DLA). In other cases, the feature extraction system 504 may extract the features from the image 502 using other types of neural network backbone. In some cases, the feature extraction system 504 may separately extract features from an input (e.g., image 502 or a feature map).

The point depth estimation system 506 may determine a first estimated depth for some or all of the points in some or all of the feature maps received from the feature extractor system 504. In some cases, the point depth estimation system 506 may be configured to determine a likelihood that the points (e.g., pixels of the image 502 corresponding to respective points) include an object (or the center of an object) and the first estimated depth using the respective semantic feature associated with the different points. In some cases, the point depth estimation system 506 may be a relatively "coarse" or "rough" estimate for the depth of each point when compared to the object classification system 512 discussed below.

In certain cases, the point depth estimation system 506 may determine a first estimated depth for each of the points in the different feature maps using a depth estimation head and include the estimated depth in one or more channels of the points.

In some cases, the points may include various channels corresponding to different depths. In some such cases, the point depth estimation system 506 may include a probability in the corresponding channels that an object is located within the corresponding range of depths or a probability that something was detected within the respective depth range. For example, if the points of a feature map includes a channel for the likelihood of an object in the points (pixels of the image 502 corresponding to the point), and separate channels for depths of 0-10 meters, 10-20 meters, 20-40 meters, and >40 meters, the first depth estimation system 504 may include separate probabilities for: the likelihood that an object is within the image area that corresponds to the point, the likelihood that something in the image is 0-10 meters away, the likelihood that something in the image is 10-20 meters away, the likelihood that something in the image is 20-40 meters away, and the likelihood that something in the image is >40 meters away. In this way, the point depth estimation system 506 may classify the points based on estimated depth and/or use a depth classification scheme to group the points similar to the way in which the object classification system 512 classifies objects in an image. Using a classification scheme for depth estimation may enable a neural network to more accurately learn how to estimate depth ranges for objects and/or points of an image 502.

Although reference is made to estimating a depth of points (or grid cells) and objects, it will be understood that the point depth estimation system 506 may use the semantic features of the grid cells and the mapping of the points to pixels in the image 502 to estimate a depth for each of the pixels of the image 502. For example, the point depth estimation system 506 may generate a feature map that includes a point for each pixel of the image 502. The grouping system 508 may generate different groups of points or grid cells based on the first corresponding estimated depth for the points. In some cases, each group generated by the grouping system 508 may correspond to a different depth range. For example, a first group of points may include (only) points of the feature map(s) with a first depth estimate that falls within the depth range of the first group of points. Similarly, other groups may include points with depth ranges within the same range.

The grouping system 508 may group (or bin) some or all of the points from some or all of the feature maps into bins. Each bin may represent a range of depths from the image sensor. In one non-limiting example, different bins may include points with depth estimates of 0-10 meters, 10-20 meters, 20-40 meters, 40-80 meters, 80-150 meters, and 150+ meters away from the image sensor, respectively. The bins may cover other ranges of depths away from the camera depending on the implementation.

In certain cases, the grouping system 508 may generate multiple groups of points based on the corresponding first estimated depth for the different points. For example, the grouping system 508 may assign points to the different groups of points based on the first estimated depth for each of the plurality of points. For example, the grouping system 508 may assign points with a first depth estimate that falls within a first depth range to a first group of points and assign points with a first depth estimate that falls within a second depth range to a second group of points.

As described herein, the points may include different channels for different depth ranges. In some such cases, the grouping system 508 may use the channel with the largest probability as the estimated depth for the point and sort the respective point accordingly.

In certain cases, the grouping system 508 may generate the plurality of groups of points using a neural network. For example, the grouping system 508 may use a differential selector such as a differential patch selector to group the points into the plurality of groups of points. In some cases, the grouping system 508 may use a differentiable perturbed optimizer to generate the plurality of groups of points.

Although the foregoing paragraphs refer to the grouping points, it will be understood that the grouping system 508 may use the semantic features of the points and the mapping of the points to pixels in the image 502 to estimate a depth and group (or bin) the pixels of an image. Similarly, the grouping system 508 may use the estimated depths of points to group (or bin) objects within the image 502 (e.g., pixels associated with a probability above a particular threshold that the pixel is part of an object).

In certain cases, the grouping system 508 may ignore or omit points/pixels that do not include an object (e.g., points and/or pixels associated with an object probability that is below a particular object probability threshold indicating that it is unlikely that an object is located within the point and/or pixel). In some such cases, the different groups or bins may (only) include points and/or pixels associated with an object probability that is above a particular object probability threshold indicating that it is likely that an object is located within the point and/or pixel. In some cases, the grouping system 508 groups or bins points regardless of the status of an object detection and/or regardless of whether an object is detected.

The object classification system 512 may determine a second estimated depth for one or more points and classify objects in the image 502. In some cases, the object classification system 512 determines an estimated depth for some or all of the points identified or processed by the feature extraction system 504 and/or point depth estimation system 506.

In some cases, the object classification system 512 determines a second estimated depth for the points using one or more range specific depth estimation heads. For example, the object classification system 512 may use a first range specific depth estimation head to estimate a second (more precise) depth for a first group of points and use a second range specific depth estimation head to estimate a second (more precise) depth for a second group of points.

In certain cases, the object classification system 512 may, for some or all points, determine the second estimated depth based on the group of points to which the individual points belong. That is, the object classification system 512 may use a different range specific depth estimation head for each group of points. For example, the object classification system 512 may determine a second estimated depth for a first group of points within a first depth range using a first range specific depth estimation head and determine a second estimated depth for a second group of points within a second depth range using a second range specific depth estimation head.

The second estimated depth for the first group of points may be more accurate than the first estimated depth for the first group of points. For example, each of the range specific depth estimation heads may be configured (e.g., trained) to estimate depths within a particular range. For example, one range specific depth estimation heads may be trained to estimate depths for points (and identify objects) within 0-10 meters, while another range specific depth estimation head is trained to estimate depths for points (and identify objects) within 20-30 meters, etc. In some cases, during training, the range specific depth estimation heads may be provided images and the outputs compared with annotated images of objects or things within a particular range and the distance of those object and/or things. In this way, the range specific depth estimation heads may be trained to identify points that fall within a particular depth range. By using multiple range specific depth estimation heads, the object classification system 512 may determine more accurate estimated depths compared to estimation techniques that are not range specific (e.g., estimation techniques that are not configured to estimate depths for the ranges associated with a specific group of points or bin).

Moreover, the object classification system 512 may determine at least one object classification for some or all of the points from some or all of the groups of points. In some cases, the object classification system 512 may classify multiple points as the same object classification and/or identify multiple points as belonging to the same object.

In certain cases, the object classification system 512 may also determine a center of at least one object based on a regression of the points belonging to the object and the features extracted using the feature extraction system 504. Advantageously, the object center determined by the object classification system 512 may be more accurate than an object center determined using other techniques due to the use of the range specific depth estimation head.

The object classification system 512 may also determine a bounding box for the at least one object. The object classification system 512 may associated the bounding box into a semantic feature with the at least one object.

In some cases, the object classification system 512 may incorporate the at least one object classification for the at least one point to create a semantic image. The semantic image may include rows and columns of pixels. Some or all pixels in the semantic image may include semantic data, such as one or more feature embeddings. In certain cases, the feature embeddings may relate to one or more object attributes, such as but not limited to an object classification or class label identifying an object's classification (sometimes referred to as an object's class) (non-limiting examples: vehicle, pedestrian, bicycle, barrier, traffic cone, drivable surface, or a background, etc.). The object classification may also be referred to as pixel class probabilities or semantic segmentation scores. In some cases, the object classification for the pixels of an image may serve as compact summarized features of the image. For example, the object classifications may include a probability value that indicates the probability that the identified object classification for a pixel is correctly predicted.

In some cases, the feature embeddings may include one or more n-dimensional feature vectors. In some such cases, an individual feature vector may not correspond to an object attribute, but a combination of multiple n-dimensional feature vectors may contain information about an object's attributes, such as, but not limited to, its classification, width, length, height, depth, etc. In certain cases, the feature embeddings may include one or more floating point numbers, which may assist a downstream model in its task of detection/segmentation/prediction.

In certain cases, the feature embeddings may include state information regarding the objects in the scene, such as but not limited to an object's position, orientation/heading, velocity, acceleration, or other information relative to the vehicle 200 or in absolute/geographic coordinates. In certain cases, the perception system 402 may generate additional feature embeddings, such as state information regarding the objects, from the image 502.

The output of the perception system 402 may be used by the planning system 404 and/or control system 408. As described herein, the planning system 404 may use the output of the perception system 402 to plan a path through a vehicle scene. For example, the planning system 404 may use the object classifications, second estimated depth of the points, estimated depth of the identified objects, and/or the (3D) bounding boxes to determine how the autonomous vehicle should be navigated to avoid a collision.

The control system 408 may cause the autonomous vehicle to be navigated based on the output of the planning system 404. Accordingly, the autonomous vehicle 200 may be navigated based at least in part on the second estimated depth for the points and the object classifications for the points or objects. In some cases, the control system 408 may navigate the autonomous vehicle based on: the second estimated depth for different points and the object classifications for the points.

Figure 7:
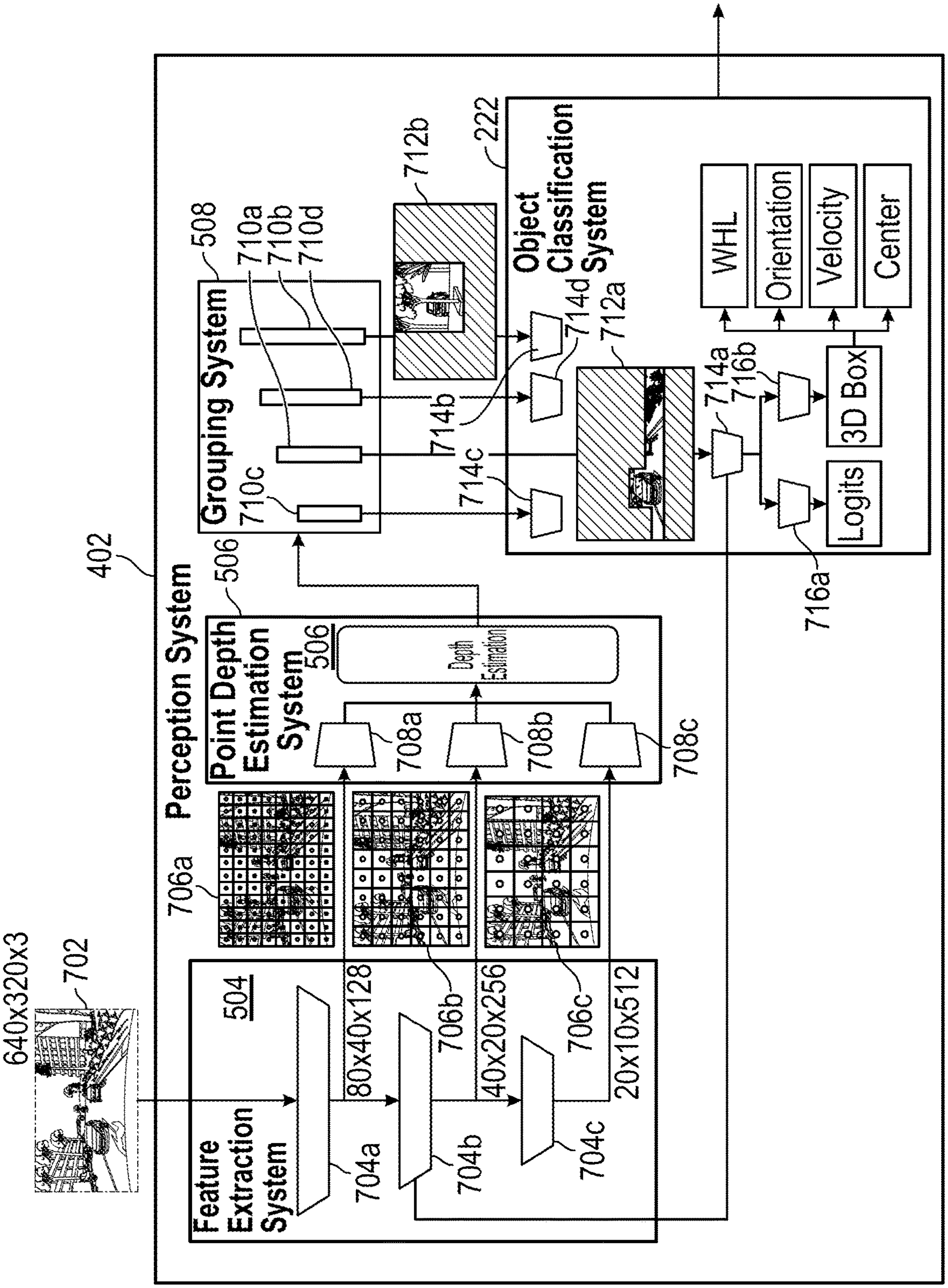
FIG. 7 is a data flow diagram illustrating an example of a perception system classifying objects in an image based on a depth associated with the objects.

FIG. 7 is a data flow diagram illustrating an example of a perception system 402 classifying objects in an image 702 based on a depth associated with the objects. The image 702 may be captured by a camera located on the autonomous vehicle 200, such as one of the cameras 202*a*. In the illustrated example, the image has the dimensions 640×320×3 (length, height, channel depth).

As described herein, the feature extraction system 504 may receive the image 702 and extract semantic features from the image 702 to generate one or more feature maps. In the illustrated example, the feature extraction system 504 generates three feature maps 704*a*, 704*b*, 704*c* (individually or collectively referred to as feature map(s) 704) using three convolution layers 706*a*, 706*b*, 706*c* (individually or collectively referred to as convolution layer(s) 706), however, it will be understood that fewer or more feature maps 704 may be generated using fewer or more convolution layers 706.

The different feature maps 704 may be different sizes. For example, the resolution of the feature maps 704 in descending order is feature map 704*a*, feature map 704*b*, and feature map 704*c*. Accordingly, the feature map 704*a* has a larger height and width (80×40) and a larger number of points or grid cells than feature map 704*b* and the feature map 704*c*. Similarly, the feature map 704*b* has a larger height and width (40×20) and a larger number of points or grid cells than feature map 704*c* (20×10).

The points or grid cells of the feature maps may have different channel depths. For example, the channel depth of feature map 704*a* is 128, the channel depth of feature map 704*b* is 256, and the channel depth of feature map 704*c* is 512. Accordingly, the points of the feature map 704*c* have more features (also referred to herein as feature embeddings, feature extractions, etc.).

As described herein, in some cases, the feature extraction system 504 generates the different feature maps 704 using different stride lengths. For example, the feature extraction system 504 may generate the feature map 704*a* using a stride length of eight, the feature map 704*b* using a stride length of sixteen, and the feature map 704*c* using a stride length of thirty-two.

As described herein, the point depth estimation system 506 may estimate a depth for some or all of the points of some or all of the different feature maps 704. In the illustrated example, the point depth estimation system 506 includes three depth estimators 708*a*, 708*b*, 708*c* (individually or collectively referred to as depth estimator(s) 708), one for each of the feature maps 704, however, it will be understood that the 506 may include fewer or more depth estimators. In some cases, some or all of the depth estimators may be implemented using a local planar guidance layer.

As described herein, in some cases, in estimating the depth for some or all of the points of the feature maps 704, the point depth estimation system 506 may classify the points into different depth ranges and/or assign a probability that a particular point falls within a particular depth range. For example, the point depth estimation system 506 may determine separate probabilities that a particular point is 0-10 meters away, 10-20 meters away, 20-30 meters away, 40-50 meters away, and/or more than 50 meters away. Some or all of the probabilities may be stored as feature mappings of feature embeddings for the different points in the corresponding feature maps. As another example, the point depth estimation system 506 may select a depth range (e.g., 40-50 meters) and assign a probability that it selected the correct depth range (e.g., 0.095).

As described herein, the grouping system 508 groups (or bins/sorts) the points from the feature maps 704 into different groups based on the depth of the respective points. In some cases, the grouping system 508 groups the points from the feature maps 704 irrespective of the feature maps 704 to which the point belongs. In certain cases, the grouping system 508 groups the points from the feature maps 704 into groups depending on the feature map to which it belongs. In some cases, when the points from the feature maps 704 are grouped, they may inherit or include features or feature embeddings from nearby points.

In the illustrated example, the grouping system 508 assigns the points to one of four different groups 710*a*, 710*b*, 710*c*, 710*d* (individually or collectively referred to as group(s) of points 710), where each group corresponds to a different depth range. (e.g., 0-10 meters, 10-30 meters, 30-50 meters, and 50+ meters). As such, each group of points 710 may include a distinct group of points corresponding to distinct pixels of the image 702. It will be understood that the grouping system 508 may use fewer or more bins or groups.

As described herein, in some cases, the grouping system 508 assigns individual points to a particular group based on an estimated depth of the point and/or the depth range channel(s) of the point that has a particular (e.g., highest) probability. For example, if a point has four depth range channels and the following probabilities for the different depth range channels are: 0.3 for 0-10 meters away, 0.9 for 10-30 meters, 0.05 for 30-50 meters, and 0.01 for 50+ meters, the grouping system 508 may assign the point to the 10-30 meters group.

As described herein, in some cases, the grouping system 508 may form part of the point depth estimation system 506 and/or the functionality of the point depth estimation system 506 may be implemented by the point depth estimation system 506. For example, the point depth estimation system 506 may group or bin the points based on the classification of the depth range and/or the depth range channel with a particular (highest) probability.

Images 712*a* and 712*b* are example visualizations of the pixels of the image 702 corresponding to the points or grid cells that are grouped to groups 710*a* and 710*b*. As shown in the images 712*a*, 712*b*, the different groups of points 710*a*, 710*b* include different points corresponding to different pixels of the image 702. Moreover, as described herein, the pixels of the images 712*a*, 712*b* correspond to groups of points 710*a*, 710*b* that have an estimated depth within their respective ranges. For example, the pixels of the image 712*a* correspond to points with an estimated depth that falls within a first range and the pixels of the image 712*b* correspond to points with an estimated depth that falls within a second range that is different from the first range.

As described herein, the object classification system 512 uses the groups of points 710 to estimate a depth of objects in the image 702 using different depth predictors 714*a*, 714*b*, 714*c*, 714*d* (individually or collectively referred to as depth predictor(s) 714). The different depth predictors 714 may correspond to the different groups of points 710. For example, each group of points 710 may be processed by a distinct depth predictor 714. As described herein, the different depth predictors 714 may be trained for their respective depth ranges. For example, the depth predictor 714*a* may be trained to estimate a depth of objects within the range corresponding to the group of points 710*a*, the depth predictor 714*b* may be trained to estimate a depth of object within the range corresponding to the group of points 710*b*, the depth predictor 714*c* may be trained to estimate a depth of object within the range corresponding to the group of points 710*c*, and the depth predictor 714*d* may be trained to estimate a depth of object within the range corresponding to the group of points 710*d*. In some cases, to train a particular depth predictor 714, the depth predictor 714 may be provided images and its output compared with annotated images in which objects or items within a particular depth range are annotated with object classifications and depths. In this way, the particular depth predictor 714 may be trained to classify objects within a particular range and estimate depths of those objects.

It will be understood that fewer or more depth predictors 714 may be used as desired. For example, in some cases, a depth predictor 714 may be trained to estimate a depth of objects within a range that corresponds to multiple groups of points 710.

As described herein, the object classification system 512 may also identify and classify objects and determine one or more properties of the objects (e.g., center, velocity orientation, width, height length, etc.) using one or more detection heads 716*a*, 716*b*. In some cases, the determined properties may be used to generate a (3D) bounding box for the object. Although only detection head 716*a*, 716*b* are shown in FIG. 7, it will be understood that the object classification system 512 may include fewer or more detection heads 716. In some cases, the object classification system 512 may include range specific detection heads 716 similar to the depth predictors 714. For example, the object classification system 512 may include a separate set of fewer or more detection heads 716 for each group (or combination of groups) of points 710. With reference to the example of FIG. 7, the object classification system 512 may include two detection heads 716 for each of the depth predictors 714*b*, 714*c*, 714*d*.

As described herein, by estimating a depth for various points or grid cells, sorting or grouping the points based on depth ranges, and estimating depths and classifying objects within the images based on the groups, the perception system 402 may improve the accuracy of the estimated depths for different objects and/or the classification of objects within an image. In this way, the perception system 402 may improve the safety of an autonomous vehicle 200.

Figure 8:
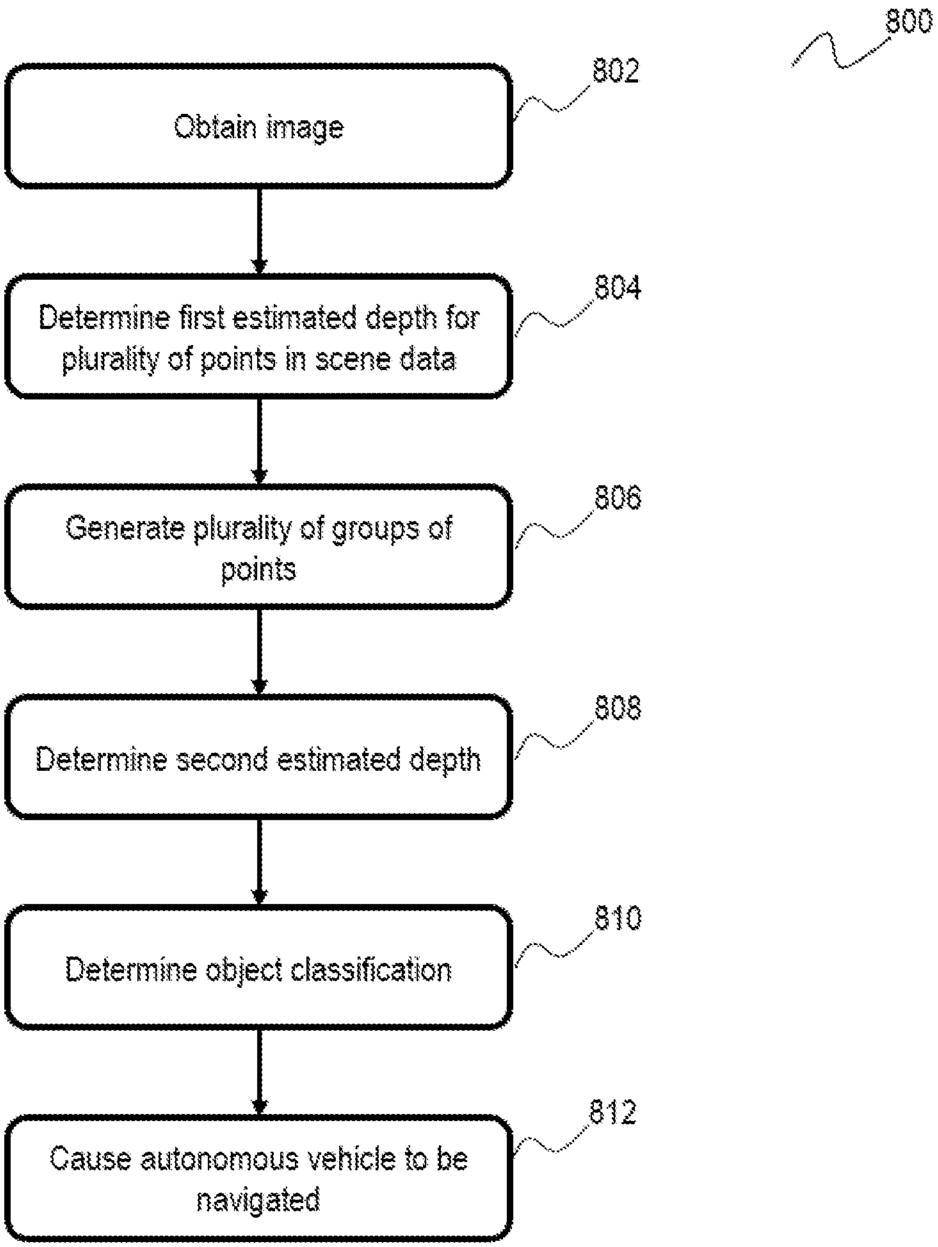
FIG. 8 is a flow diagram illustrating an example of a routine 800 implemented by one or more processors to control navigation of an autonomous vehicle using depth estimations for points in an image.

FIG. 8 is a flow diagram illustrating an example of a routine 800 implemented by one or more processors to control navigation of an autonomous vehicle using depth estimations for points in an image. The flow diagram illustrated in FIG. 8 is provided for illustrative purposes only. It will be understood that one or more of the steps of the routine illustrated in FIG. 8 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 802, the perception system 402 obtains an image 502 associated with a scene of a vehicle 200. As described herein, the image 502 may include an image captured by a camera coupled to the vehicle 200. In some cases, the image received at 902 is real-time image generated using sensor data obtained from sensors as a vehicle 200 operates in an environment. As described herein, the perception system 402 may obtain the image while the autonomous vehicle is navigating the vehicle scene.

At block 804, the perception system 402 determines a first estimated depth for each of a plurality of points in the image. In some cases, the first estimated depth may correspond to a depth range or range of depths.

As described herein, in some cases, to determine the first estimated depth for the plurality of points, the perception system 402 may identify distinct sets of points (e.g., corresponding to different convolutions and/or different stride lengths or corresponding to different feature maps) and determine an estimated depth for some or all of the points in the distinct sets of points. In certain cases, the distinct sets of points or feature maps may have different resolutions or a different number of points. For example, a first feature map (or first set of points) may have more points than a second feature map (or second set of points). In some cases, the resolution or number of points may be based on a stride length of a convolution applied to the image or feature map, where a larger stride length may result in a lower resolution.

Moreover, the points of the first feature map may be evenly distributed across the image relative to each other (e.g., the image may be evenly divided by grid cells). Similarly, the points of the second feature map may be evenly distributed across the image relative to each other (e.g., the image may be evenly divided by grid cells).

In some cases, the perception system 402 may use a neural network backbone (e.g., ResNET, SENet, DLA) to determine semantic data associated with the different points and use the determined semantic data to determine the estimated depth of the respective points.

In some cases, the perception system 402 may use one or more depth estimation heads to estimate the depth of the points. In certain cases, the perception system 402 may use distinct depth estimation heads for the different sets of points (or feature maps). For example, the perception system 402 may use a first depth estimation head for a first set of points in a first feature map and use a second depth estimation head for a second set of points in a second feature map.

In some cases, the semantic data or feature(s) associated with the points may indicate the first estimated depth for the points. For example, in certain cases, a semantic feature may indicate a depth range classification and a probability that the classification is correct. In some cases, multiple semantic features (or channels) may be used for different depth ranges, and a probability that the point is in the different depth ranges may be provided. In some such cases, the depth range channel for a particular point having the highest probability may be identified as the first estimated depth for the particular point.

At block 806, the perception system 402 generates a plurality of groups of points based on the first estimated depth for the plurality of points. As described herein, in some cases, each group of the plurality of groups of points may correspond to a different depth range. For example, a first group may correspond to a range of 0-20 meters, a second group may correspond to a range of 20-40 meters, and so on. Accordingly, the perception system 403 may bin the points into (or assign the points to) the plurality of groups of points based on the first estimated depth for the respective points.

In some cases, each point is assigned to one group of points such that each group of points includes a set of non-overlapping points. The points in a group may be contiguous or non-contiguous. For example, the points in a group may correspond to pixels in a top left and bottom right of an image.

At block 808, the perception system 402 determines a second estimated depth for at least one point of a first group of points of the plurality of groups of points. In some cases, the perception system 402 may determine the second estimated depth for the at least one point using a range specific depth estimation head. In certain cases, the perception system 402 may use a different range specific depth estimation head for each of the plurality of groups of points and determine the second corresponding estimated depth for a given point based on the range specific depth estimation head for the group of points containing the given point.

The second estimated depth may be more accurate or more precise than the first estimated depth. In some cases, the first estimated depth may be in depth ranges of tens of feet or meters (e.g., 0-10 ft. or meters, 10-20 ft. or meters, etc.), and the second estimated depth may be in smaller ranges (e.g., 2-3 ft or meters) or no range. For example, while the first estimated depth for a point may include a depth range (e.g., 10-20 meters, 30-40 meters, etc.), the second estimated depth may indicate a narrower or more precise depth range than the first estimated depth (e.g., 33-35 meters) and/or indicate a particular or precise (non-range) estimated depth (e.g., 15 meters, 25 meters, 42 meters, etc.).

At block 810, the perception system 402 may determine at least one object classification for the at least one point of the first group of points. In certain cases, the object classification system 512 may also determine at least one object classification for the at least one point of the second group of points.

In some cases, the perception system 402 may determine the object classifications using one or more detection heads. In certain cases, the perception system 402 may use a different range specific detection head for each of the plurality of groups of points. Accordingly, in some such cases, the perception system 402 may use a first detection head to classify at least one object associated with the at least one point of the first group of points and use a second (distinct) detection head to classify the at least one object associated with the at least one point of the second group of points.

The object classification system 512 may determine at least one object classification for the at least one point of the first group of points. The object classification system 512 may also identify at least one object that includes a plurality of points having the same object classification. In certain cases, the object classification system 512 may also determine a center of the at least one object based on a regression of the points belonging to the object and the features extracted using the feature extraction system 504. Advantageously, the object center determined by the object classification system 512 may be more accurate than an object center determined using other techniques due to the use of the range specific depth estimation head.

At block 812, the perception system 402 may cause the autonomous vehicle to be navigated based on the second corresponding estimated depth for the at least one point of the first group of points and the at least one object classification for the at least one point of the first group of points. As described herein, the perception system 402 may communicate the second corresponding estimated depth for the at least one point of the first group of points and the at least one object classification for the at least one point of the first group of points to the control system 408, which may adjust one or more control parameters (e.g., steering wheel, accelerator, decelerator, etc.) based on the second corresponding estimated depth for the at least one point of the first group of points and the at least one object classification for the at least one point of the first group of points to cause the vehicle 200 to move.

Fewer, more, or different blocks can be included in the routine 800 and/or the blocks can be reordered. In some cases, the routine can be repeated hundreds, thousands, or millions of times as the perception system 402 receives images. For example, the routine 800 may occur multiple times a second while a vehicle 200 is in operation.

Aspects of system provide one or more advantages over other systems for estimating the depths of points in the image 502. For example, the system may more accurately estimate the depth of points in the image 502, for example, by grouping points based on a first depth estimate, and estimating a second depth of the points based on a range specific depth estimation head. In some cases, the depth of points in the image 502 can be estimated based on 2D images obtained from a camera, which may not natively provide depth information. The system may use the more accurate depth estimations to navigate the vehicle around the detect objects in the environment.

EXAMPLES

Various example embodiments of the disclosure can be described by the following clauses:

Clause 1. A method for operating an autonomous vehicle, the method comprising: obtaining image associated with a scene of an autonomous vehicle;

determining a first estimated depth for each of a plurality of points in the image;

generating a plurality of groups of points based on the first estimated depth for each of the plurality of points, wherein each group of the plurality of groups of points corresponds to a different depth range; determining a second estimated depth for at least one point of a first group of points of the plurality of groups of points using a range specific depth estimation head; determining at least one object classification for the at least one point of the first group of points; and causing the autonomous vehicle to be navigated based on the second estimated depth for the at least one point of the first group of points and the at least one object classification for the at least one point of the first group of points.

Clause 2. The method of clause 1, wherein determining a first estimated depth for each of a plurality of points in the image comprises: identifying a first set of points in the image; identifying a second set of points in the image, wherein the plurality of points includes the first set of points and the second set of points; and associating a set of semantic features with each of the plurality of points; and determining the first estimated depth for each of the plurality of points in the image using the set of semantic features associated with the each of the plurality of points.

Clause 3. The method of clause 2, wherein the first set of points is greater than the second set points.

Clause 4. The method of any of clauses 2-3, wherein the first set of points are equally distributed across the image relative to each other and the seconds set of points are equally distributed across the image relative to each other.

Clause 5. The method of any of clauses 2-4, wherein associating a set of semantic features with each of the plurality of points comprises generating a set of semantic features for each of the plurality of points using a neural network backbone.

Clause 6. The method of clause 5, wherein the neural network backbone is a deep residual network (ResNet).

Clause 7. The method of any of clauses 1-6, wherein determining the first estimated depth for each of the plurality of points in the image comprises determining the first estimated depth for each of the plurality of points in the image using a depth estimation head.

Clause 8. The method of any of clauses 1-7, wherein each of the plurality of groups of points includes points of the plurality of points with the first depth estimate that falls within the depth range of the respective group of points.

Clause 9. The method of any of clauses 1-8, wherein the first group of points includes only points of the plurality of points with the first depth estimate that falls within the depth range of the first group of points.

Clause 10. The method of any of clauses 1-9, wherein generating the plurality of groups of points based on the first estimated depth for each of the plurality of points comprises assigning points to the groups of points based on the first estimated depth for each of the plurality of points, wherein points of the plurality of points with the first depth estimate that falls within a first depth range are assigned to the first group of points and points of the plurality of points with the first depth estimate that falls within a second depth range are assigned to a second group of points of the plurality of groups of points.

Clause 11. The method of any of clauses 1-10, wherein the range specific depth estimation head is a first range specific depth estimation head, the method further comprising: determining a second estimated depth for at least one point of a second group of points of the plurality of groups of points using a second range specific depth estimation head; and determining at least one object classification for the at least one point of the second group of points, wherein navigating the autonomous vehicle comprises navigating the autonomous vehicle based on: the second estimated depth for the at least one point of the first group of points, the at least one object classification for the at least one point of the first group of points, the second estimated depth for the at least one point of the second group of points, and the at least one object classification for the at least one point of the second group of points.

Clause 12. The method of any of clauses 1-11, wherein the second estimated depth for the at least one point of the first group of points is more precise than the first estimated depth for the at least one point of the first group of points.

Clause 13. A system, comprising: memory, and at least one processor configured to: obtain an image associated with a scene of an autonomous vehicle; determine a first estimated depth for each of a plurality of points in the image; generate a plurality of groups of points based on the first estimated depth for each of the plurality of points, wherein each group of the plurality of groups of points corresponds to a different depth range; determine a second estimated depth for at least one point of a first group of points of the plurality of groups of points using a range specific depth estimation head; determine at least one object classification for the at least one point of the first group of points; and cause the autonomous vehicle to be navigated based on the second estimated depth for the at least one point of the first group of points and the at least one object classification for the at least one point of the first group of points.

Clause 14. The system of clause 13, wherein determining a first estimated depth for each of a plurality of points in the image comprises: identifying a first set of points in the image; identifying a second set of points in the image, wherein the plurality of points includes the first set of points and the second set of points; and associating a set of semantic features with each of the plurality of points; and determining the first estimated depth for each of the plurality of points in the image using the set of semantic features associated with the each of the plurality of points.

Clause 15. The system of clause 14, wherein the first set of points is greater than the second set points.

Clause 16. The system of any of clauses 14-15, wherein the first set of points are equally distributed across the image relative to each other and the seconds set of points are equally distributed across the image relative to each other.

Clause 17. The system of any of clauses 14-16, wherein associating a set of semantic features with each of the plurality of points comprises generating a set of semantic features for each of the plurality of points using a neural network backbone.

Clause 18. At least one non-transitory storage media storing computer-executable instructions that, when executed by at least one processor, cause the at least one processor to: obtain an image associated with a scene of an autonomous vehicle; determine a first estimated depth for each of a plurality of points in the image; generate a plurality of groups of points based on the first estimated depth for each of the plurality of points, wherein each group of the plurality of groups of points corresponds to a different depth range; determine a second estimated depth for at least one point of a first group of points of the plurality of groups of points using a range specific depth estimation head; determine at least one object classification for the at least one point of the first group of points; and cause the autonomous vehicle to be navigated based on the second estimated depth for the at least one point of the first group of points and the at least one object classification for the at least one point of the first group of points.

Clause 19. The at least one non-transitory storage media of clause 18, wherein determining a first estimated depth for each of a plurality of points in the image comprises:

identifying a first set of points in the image; identifying a second set of points in the image, wherein the plurality of points includes the first set of points and the second set of points; and associating a set of semantic features with each of the plurality of points; and determining the first estimated depth for each of the plurality of points in the image using the set of semantic features associated with the each of the plurality of points.

Clause 20. The at least one non-transitory storage media of clause 19, wherein the first set of points is greater than the second set points.

Clause 21. The at least one non-transitory storage media of any of clauses 19-20, wherein the first set of points are equally distributed across the image relative to each other and the seconds set of points are equally distributed across the image relative to each other.

Clause 22. The at least one non-transitory storage media of any of clauses 19-21, wherein associating a set of semantic features with each of the plurality of points comprises generating a set of semantic features for each of the plurality of points using a neural network backbone.

Clause 23. The at least one non-transitory storage media of any of clauses 18, wherein the neural network backbone is a deep residual network (ResNet).

Clause 24. The at least one non-transitory storage media of any of clauses 18-23, wherein to determine the first estimated depth for each of the plurality of points in the image, the computer-executable cause the at least one processor to determine the first estimated depth for each of the plurality of points in the image using a depth estimation head.

Clause 25. The at least one non-transitory storage media of any of clauses 18-24, wherein each of the plurality of groups of points includes points of the plurality of points with the first depth estimate that falls within the depth range of the respective group of points.

Clause 26. The at least one non-transitory storage media of any of clauses 18-25, wherein the first group of points includes only points of the plurality of points with the first depth estimate that falls within the depth range of the first group of points.

Clause 27. The at least one non-transitory storage media of any of clauses 18-26, wherein to generate the plurality of groups of points based on the first estimated depth for each of the plurality of points, the computer-executable cause the at least one processor to assign points to the groups of points based on the first estimated depth for each of the plurality of points, wherein points of the plurality of points with the first depth estimate that falls within a first depth range are assigned to the first group of points and points of the plurality of points with the first depth estimate that falls within a second depth range are assigned to a second group of points of the plurality of groups of points.

Clause 28. The at least one non-transitory storage media of any of clauses 18-27, wherein the range specific depth estimation head is a first range specific depth estimation head, wherein the computer-executable further cause the at least one processor to determine a second estimated depth for at least one point of a second group of points of the plurality of groups of points using a second range specific depth estimation head; and determine at least one object classification for the at least one point of the second group of points, wherein to navigate the autonomous vehicle the computer-executable cause the at least one processor to navigate the autonomous vehicle based on: the second estimated depth for the at least one point of the first group of points, the at least one object classification for the at least one point of the first group of points, the second estimated depth for the at least one point of the second group of points, and the at least one object classification for the at least one point of the second group of points.

Clause 29. The at least one non-transitory storage media of any of clauses 18-28, wherein the second estimated depth for the at least one point of the first group of points is more precise than the first estimated depth for the at least one point of the first group of points.

Clause 30. The system of clause 17, wherein the neural network backbone is a deep residual network (ResNet).

Clause 31. The system of any of clauses 13-17 or 30, wherein to determine the first estimated depth for each of the plurality of points in the image, the computer-executable cause the at least one processor to determine the first estimated depth for each of the plurality of points in the image using a depth estimation head.

Clause 32. The system of any of clauses 13-17, or 30-31, wherein each of the plurality of groups of points includes points of the plurality of points with the first depth estimate that falls within the depth range of the respective group of points.

Clause 33. The system of any of clauses 13-17, or 30-32, wherein the first group of points includes only points of the plurality of points with the first depth estimate that falls within the depth range of the first group of points.

Clause 34. The system of any of clauses 13-17, or 30-33, wherein to generate the plurality of groups of points based on the first estimated depth for each of the plurality of points, the computer-executable cause the at least one processor to assign points to the groups of points based on the first estimated depth for each of the plurality of points, wherein points of the plurality of points with the first depth estimate that falls within a first depth range are assigned to the first group of points and points of the plurality of points with the first depth estimate that falls within a second depth range are assigned to a second group of points of the plurality of groups of points.

Clause 35. The system of any of clauses 13-17, or 30-34, wherein the range specific depth estimation head is a first range specific depth estimation head, wherein the computer-executable further cause the at least one processor to determine a second estimated depth for at least one point of a second group of points of the plurality of groups of points using a second range specific depth estimation head; and determine at least one object classification for the at least one point of the second group of points, wherein to navigate the autonomous vehicle the computer-executable cause the at least one processor to navigate the autonomous vehicle based on: the second estimated depth for the at least one point of the first group of points, the at least one object classification for the at least one point of the first group of points, the second estimated depth for the at least one point of the second group of points, and the at least one object classification for the at least one point of the second group of points.

Clause 36. The system of any of clauses 13-17, or 30-35, wherein the second estimated depth for the at least one point of the first group of points is more precise than the first estimated depth for the at least one point of the first group of points.

ADDITIONAL EXAMPLES

All of the methods and tasks described herein may be performed and fully automated by a computer system. The computer system may, in some cases, include multiple distinct computers or computing devices that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may be co-located. The results of the disclosed methods and tasks may be persistently stored by transforming physical storage devices, such as solid-state memory chips or magnetic disks, into a different state.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method for operating an autonomous vehicle, the method comprising:

- generating a first feature map based on an image associated with a scene of an autonomous vehicle, the first feature map including a first plurality of points in the image;
- generating a second feature map based on the image, the second feature map including a second plurality of points in the image, the second feature map having a lower resolution than the first feature map,
- wherein the first feature map and the second feature map represent a substantially same area of the scene;
- determining a first estimated depth for each of the first plurality of points in the first feature map and the second plurality of points in the second feature map;
- generating a plurality of groups of points based on the first estimated depth for each of the first plurality of points and the second plurality of points, wherein each group of points of the plurality of groups of points corresponds to a different depth range;
- determining a second estimated depth for at least one first point of a first group of points of the plurality of groups of points using a first range specific depth estimation head;
- determining a second estimated depth for at least one second point of a second group of points of the plurality of groups of points using a second range specific depth estimation head;
- determining at least one first object classification for the at least one first point of the first group of points and at least one second object classification for the at least one second point of the second group of points; and
- causing the autonomous vehicle to be navigated based on the second estimated depth for the at least one first point, the second estimated depth for the at least one second point, and the at least one first object classification for the at least one first point of the first group of points.

2. The method of claim 1, wherein determining the first estimated depth for each of the first plurality of points in the first feature map comprises:

- associating a set of semantic features with each of the first plurality of points; and
- determining the first estimated depth for each of the first plurality of points in the first feature map using the set of semantic features associated with the each of the first plurality of points.

3. The method of claim 2, wherein the first plurality of points includes a greater number of points than the second plurality of points.

4. The method of claim 2, wherein the first plurality of points are equally distributed across the image relative to each other and the second plurality of points are equally distributed across the image relative to each other.

5. The method of claim 2, wherein associating a set of semantic features with each of the first plurality of points comprises generating a set of semantic features for each of the first plurality of points using a neural network backbone.

6. The method of claim 5, wherein the neural network backbone is a deep residual network (ResNet).

7. The method of claim 1, wherein determining the first estimated depth for each of the first plurality of points and the second plurality of points comprises determining the first estimated depth for each of the first plurality of points and the second plurality of points using a depth estimation head.

8. The method of claim 1, wherein each of the plurality of groups of points includes at least one point of the first plurality of points and the second plurality of points, wherein the first estimated depth of the at least one point falls within the depth range of the respective group of points.

9. The method of claim 1, wherein the first group of points includes only points of the first plurality of points and the second plurality of points with the first estimated depth that falls within the depth range of the first group of points.

10. The method of claim 1, wherein generating the plurality of groups of points based on the first estimated depth for each of the first plurality of points and the second plurality of points comprises assigning respective points of the first plurality of points and the second plurality of points to the groups of points based on the first estimated depth of the respective points,

- wherein points of the first plurality of points and the second plurality of points with the first estimated depth that falls within a first depth range are assigned to the first group of points and points of the first plurality of points and the second plurality of points with the first estimated depth that falls within a second depth range are assigned to a second group of points of the plurality of groups of points.

11. The method of claim 1, wherein the second estimated depth for the at least one first point of the first group of points is more precise than the first estimated depth for the at least one first point of the first group of points.

12. The method of claim 1, wherein the second plurality of points of the second feature map have a higher channel depth than the first plurality of points of the first feature map.

13. A system, comprising:

- at least one processor, and
- at least one non-transitory storage media storing instructions that, when executed by the at least one processor, cause the at least one processor to:
  - generate a first feature map based on an image associated with a scene of an autonomous vehicle, the first feature map including a first plurality of points in the image;
  - generate a second feature map based on the image, the second feature map including a second plurality of points in the image, the second feature map having a lower resolution than the first feature map, wherein the first feature map and the second feature map represent a substantially same area of the scene;

determine a first estimated depth for each of the first plurality of points in the first feature map and the second plurality of points in the second feature map;

generate a plurality of groups of points based on the first estimated depth for each of the first plurality of points and the second plurality of points, wherein each group of points of the plurality of groups of points corresponds to a different depth range;

determine a second estimated depth for at least one first point of a first group of points of the plurality of groups of points using a first range specific depth estimation head;

determine a second estimated depth for at least one second point of a second group of points of the plurality of groups of points using a second range specific depth estimation head;

determine at least one first object classification for the at least one first point of the first group of points and at least one second object classification for the at least one second point of the second group of points; and cause the autonomous vehicle to be navigated based on the second estimated depth for the at least one first point, the second estimated depth for the at least one second point, and the at least one first object classification for the at least one first point of the first group of points.

14. The system of claim 13, wherein determining the first estimated depth for each of the first plurality of points in the first feature map comprises:

associating a set of semantic features with each of the first plurality of points; and determining the first estimated depth for each of the first plurality of points in the first feature map using the set of semantic features associated with the each of the first plurality of points.

15. The system of claim 14, wherein the first plurality of points includes a greater number of points than the second plurality of points.

16. The system of claim 14, wherein the first plurality of points are equally distributed across the image relative to each other and the second plurality of points are equally distributed across the image relative to each other.

17. The system of claim 14, wherein associating a set of semantic features with each of the first plurality of points comprises generating a set of semantic features for each of the first plurality of points using a neural network backbone.

18. At least one non-transitory storage media storing instructions that, when executed by at least one processor, cause the at least one processor to:

generate a first feature map based on an image associated with a scene of an autonomous vehicle, the first feature map including a first plurality of points in the image;

generate a second feature map based on the image, the second feature map including a second plurality of points in the image, the second feature map having a lower resolution than the first feature map, wherein the first feature map and the second feature map represent a substantially same area of the scene;

determine a first estimated depth for each of the first plurality of points in the first feature map and the second plurality of points in the second feature map;

generate a plurality of groups of points based on the first estimated depth for each of the first plurality of points and the second plurality of points, wherein each group of points of the plurality of groups of points corresponds to a different depth range;

determine a second estimated depth for at least one first point of a first group of points of the plurality of groups of points using a first range specific depth estimation head;

determine a second estimated depth for at least one second point of a second group of points of the plurality of groups of points using a second range specific depth estimation head;

determine at least one first object classification for the at least one first point of the first group of points and at least one second object classification for the at least one second point of the second group of points; and cause the autonomous vehicle to be navigated based on the second estimated depth for the at least one first point, the second estimated depth for the at least one second point, and the at least one first object classification for the at least one first point of the first group of points.

19. The at least one non-transitory storage media of claim 18, wherein determining the first estimated depth for each of the first plurality of points in the first feature map comprises:

associating a set of semantic features with each of the first plurality of points; and determining the first estimated depth for each of the first plurality of points in the first feature map using the set of semantic features associated with the each of the first plurality of points.

20. The at least one non-transitory storage media of claim 19, wherein the first plurality of points includes a greater number of points than the second plurality of points.

* * * * *